(12) United States Patent
Jeansonne et al.

(10) Patent No.: US 10,067,770 B2
(45) Date of Patent: Sep. 4, 2018

(54) PLATFORM KEY HIERARCHY

(71) Applicant: Hewlett-Packard Development Company, L.P., Houston, TX (US)

(72) Inventors: Jeffrey K. Jeansonne, Houston, TX (US); Lan Wang, Cypress, TX (US); Valiuddin Y. Ali, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 14/976,863

(22) Filed: Dec. 21, 2015

(65) Prior Publication Data

US 2017/0177373 A1 Jun. 22, 2017

(51) Int. Cl.
*G06Q 10/02* (2012.01)
*G06Q 20/32* (2012.01)
*G06F 9/4401* (2018.01)

(52) U.S. Cl.
CPC .................. *G06F 9/4403* (2013.01)

(58) Field of Classification Search
CPC .................................................... G06F 9/4403
USPC .......................................................... 713/171
See application file for complete search history.

(56) References Cited

U.S. PATENT DOCUMENTS

| 8,543,839 | B2 | 9/2013 | Sibert | |
|---|---|---|---|---|
| 8,966,657 | B2 | 2/2015 | Martinez et al. | |
| 9,147,086 | B1* | 9/2015 | Potlapally | G06F 21/57 |
| 2008/0229103 | A1* | 9/2008 | Mutka | H04L 63/0876 |
| | | | | 713/168 |
| 2011/0154023 | A1 | 6/2011 | Smith et al. | |
| 2014/0380031 | A1* | 12/2014 | Jones | G06F 21/572 |
| | | | | 713/2 |
| 2017/0249099 | A1* | 8/2017 | Jun | G06F 3/0637 |

OTHER PUBLICATIONS

Levy, Omer, et al, "Advanced Security Features of Intel vPro Technology", Intel Technology Journal, vol. 12 Issue 4, Dec. 23, 2008, 120 pages.

* cited by examiner

*Primary Examiner* — Kambiz Zand
*Assistant Examiner* — Aubrey H Wyszynski
(74) *Attorney, Agent, or Firm* — Brooks, Cameron & Heubsch

(57) ABSTRACT

In one example, a system for a platform key hierarchy includes an embedded controller to, store a first public platform key with a key bit list corresponding to a number of valid private platform keys, and verify a second public platform key by comparing a key number corresponding to a private platform key to the key bit list.

15 Claims, 3 Drawing Sheets

PLATFORM KEY HIERARCHY

BACKGROUND

A computing system can include instructions to perform various startup functions of the computing system. The instructions can include Basic Input/Output System (BIOS) instructions. BIOS instructions can be the subject of attacks by malware in the computing system or from an external service. As a result of an attack, the BIOS instructions can become compromised.

DETAILED DESCRIPTION

Figure 1:
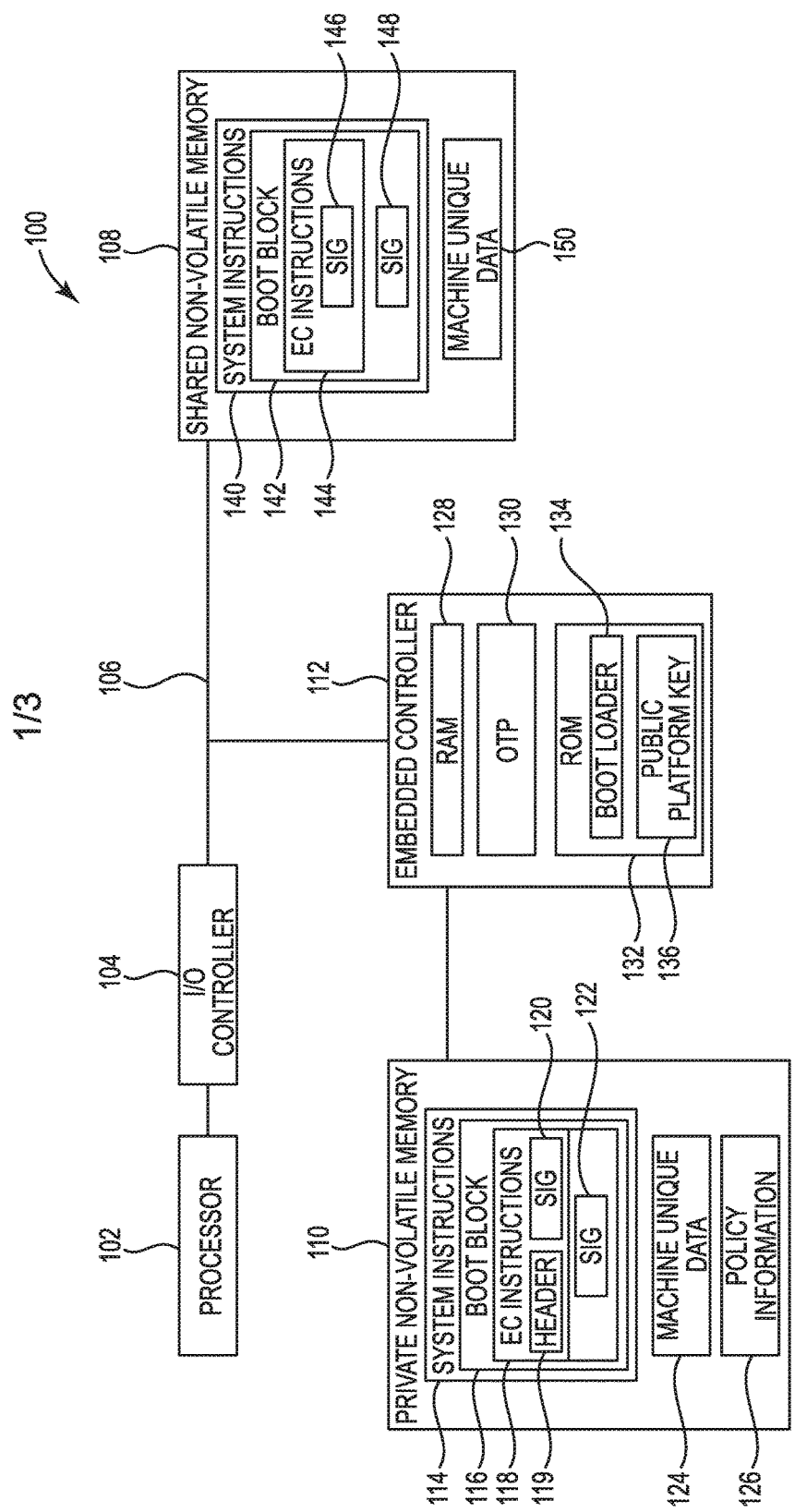
FIG. 1 illustrates a diagram of an example of a system for a platform key hierarchy consistent with the present disclosure.

A number of examples for a platform key hierarchy are described herein. In one example, a system for a platform key hierarchy an embedded controller to, store a first public platform key with a key bit list corresponding to a number of valid private platform keys, and verify a second public platform key by comparing a key number corresponding to a private platform key to the key bit list. In some examples, the header can include the key number corresponding to the private platform key utilized to generate a signature. In some examples, the key number corresponding to the private platform key can be included within the header of a verification request as described herein. In some examples, the public platform key can be a platform BIOS authentication key that is permanently embedded within the embedded controller. For example, the public platform key can be stored on a read only memory (ROM) resource within the embedded controller.

In some examples, the embedded controller can include a ROM resource, a random access memory (RAM) resource, and/or a one-time programmable (OTP) memory resource. The ROM resource of the embedded controller can include a boot loader and a public platform key that can be a master key of a platform key hierarchy. The public platform key can be organized within a platform key hierarchy by utilizing a number of corresponding private platform key numbers for each of a number of private platform keys. In some examples, the embedded controller can utilize the OTP memory resource to store a key bit list. In some examples, the key bit list can include a blocked/revoked key bit mask that can be utilized to determine which of the number of private platform keys utilized to generate a signature to be verified by the embedded controller are active private platform keys for utilization and which are blocked or inactive private platform keys not for utilization.

In some examples, the key bit list can be utilized to activate or deactivate platform keys. For example, when a signature generated by a private platform key is presented to the embedded controller, the signature can include a private platform key number corresponding to the private platform key, and/or a header corresponding to the private platform key. In this example, for the private key to be verified, the public platform key can decrypt the signature encrypted by the private platform key to determine if the decrypted signature corresponds to a verified value. In some examples, the header must also match a header provided with the private platform key or signature generated by the private platform key.

Utilizing the platform key hierarchy can provide an embedded controller that supports multiple generations of platforms even when a new rooted platform instruction signing is utilized. In some examples, an embedded controller can support a plurality of different chains of trust while blocking the possibility that a first chain of trust compromises a second chain of trust. For example, the same embedded controller on a platform can utilize a first BIOS (e.g., BIOS that is different than the manufactured BIOS or original BIOS, etc.) and a first platform key with no compromise of a second BIOS (e.g., manufacturer's BIOS, original BIOS, etc.) and a second platform key. Furthermore, a particular private platform key can be revoked from a read only memory on the embedded controller.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense FIG. 1 illustrates a diagram of an example of a system 100 for a platform key hierarchy consistent with the present disclosure. The system 100 can be a computing system that includes a processor 102 coupled to an input/output (I/O) controller 104. In some examples, the I/O controller 104 can be coupled to an embedded controller 112 and/or a shared non-volatile memory resource 108. In some examples, the embedded controller 112 can be coupled to the shared non-volatile memory resource 108 and a private non-volatile memory resource 110.

As used herein, the processor 102 can include a number of processors capable of executing instructions stored on a memory resource (e.g., shared non-volatile memory resource 108, etc.). The instructions can include program instructions such as machine readable instructions that can be executed by the processor to implement a function. As used herein, the I/O controller 104 can be utilized to manage communication between the processor 102 and the shared non-volatile memory resource 108 and/or communication between the processor 102 and the embedded controller 112.

In some examples, the private non-volatile memory resource 110 can include system instructions 114. The system instructions 114 can include machine readable instructions (e.g., computer readable instructions (CRI), firmware, logic, etc.) that when executed by a processor can implement a function as described herein. In some examples, the system instructions 114 can include a boot block 116. In some examples, the boot block 116 can include embedded controller instructions 118 that are executed when the system 100 starts up. In some examples, the boot block 116 can include BIOS instructions that are executed when the system starts up. In some examples, the embedded controller instructions 118 can be executed prior to other BIOS instructions. In these examples, the embedded controller instructions 118 can be utilized to check an integrity of the other BIOS instructions.

In some examples, the embedded controller instructions 118 can include a number of signatures 120, 122 and/or a header 119. The number of signatures 120,122 can be confirmed to have been generated by a private platform key on a memory device such as an external memory device (e.g., protected memory device). As used herein, an external memory device can include a memory device that is external to a target system. The number of signatures 120, 122 can be utilized to verify a source and integrity of embedded controller instructions.

In some examples, the private non-volatile memory resource 110 can include machine unique data 124. The machine unique data 124 can include data and/or settings that can be unique to the system 100. For example, the machine unique data 124 can include, but is not limited to: a product name, a product model, a stock-keeping unit (SKU) number, a serial number of the system 100, a tracking number, a system configuration number, and/or warranty data for the system 100. In some examples, the private non-volatile memory resource 110 can include policy information 126. The policy information 126 can include information relating to a number of policies of the system 100. For example, the policy information 126 can include, but is not limited to: a mode of operation for the system, a policy specifying a manual or automated recovery mode, and/or a policy specifying a lock or unlocked mode of the system 100.

In some examples, the shared non-volatile memory resource 108 can be a copy or partial copy of the private non-volatile memory resource 110. For example, the shared non-volatile memory resource 108 can include: system instructions 140 that correspond to the system instructions 114, a boot block 142 that corresponds to boot block 116, embedded controller instructions 144 that correspond to the embedded controller instructions 118, a number of signatures 146, 148 that corresponds to the number of signatures 120, and/or machine unique data 150 that corresponds to machine unique data 124.

In some examples, the embedded controller 112 can be implemented with a microcontroller, an application specific integrated circuit (ASIC), a programmable gate array (PGA), or type of programmable circuit. In some examples, the embedded controller 112 can include random access memory (RAM) 128. As used herein, RAM 128 can include a memory resource that can be read and/or written to via a processor. In some examples, the RAM 128 can be utilized to store data and/or instructions associated with the embedded controller 112.

In some examples, the embedded controller 112 can include a one-time programmable (OTP) memory resource 130. The OTP memory resource 130 can be a memory resource where each setting of a bit is locked by a fuse or antifuse. For example, the data stored in the OTP memory resource 130 can be permanent data that may not be able to be changed. In another example, the OTP memory resource 130 can include a key bit list where each bit of the key bit list is locked by a fuse or antifuse.

In some examples, new data can be written to the OTP memory resource 130, but data may not be able to be altered or deleted once it is written to the OTP memory resource 130. In some examples, the OTP memory resource 130 can be utilized to permanently store a key bit list. In some examples, the key bit list can include a blocked/revoked key bit mask that can be utilized to determine which of a number of private platform keys stored in an external memory resource (not shown) correspond to active private platform keys for utilization and which correspond to blocked or inactive private platform keys not for utilization.

In some examples, the embedded controller 112 can include a ROM resource 132. The ROM resource 132 can be a read only memory that is programmed by a manufacturer of the system 100. In some examples, the ROM resource 132 can include a boot loader 134 and a public platform key 136 (e.g., an encryption key, etc.). The boot loader 134 can include instructions that are utilized to boot the computing system 100 and/or resume the computing system 100 from a low power state. In some examples, the embedded controller instructions 118 can be verified prior to executing the instructions within the embedded controller 112. In some examples, an authenticity and/or integrity of the embedded controller instructions 118 can be verified to correspond to a private key using the private key generated signature as described herein. For example, verifying a private platform key generated signature can include comparing a hash of the embedded controller instructions 118 to the value of the signatures decrypted by the public key prior to executing the embedded controller instructions 118.

In some examples, the public platform key 136 can be permanently stored with a key bit list. As described further herein, the key bit list can be compared with a key number corresponding to a private key or signature generated by the private key to determine if a particular private key is a valid key or if the particular private key is an invalid key that has been revoked via the key bit list. As described herein, the public platform key can be permanently stored in the ROM resource 132 and may not be able to be physically removed or replaced from the ROM.

The system 100 can be utilized to provide the embedded controller 112 with the capability of supporting multiple generations of a platform (e.g., BIOS platform, etc.). As described herein, the embedded controller 112 can utilize a public platform key 136, a key bit list, and header 119 to conditionally authorize a number of private platform keys. In some examples, a platform key from the plurality of private platform keys can be revoked by updating the key bit list stored in the OTS' memory resource 130. By utilizing the platform key hierarchy as describe herein, the embedded controller 112 can utilize or selectively block a number of different BIOS instructions with an identical embedded controller 112 component.

Figure 2:
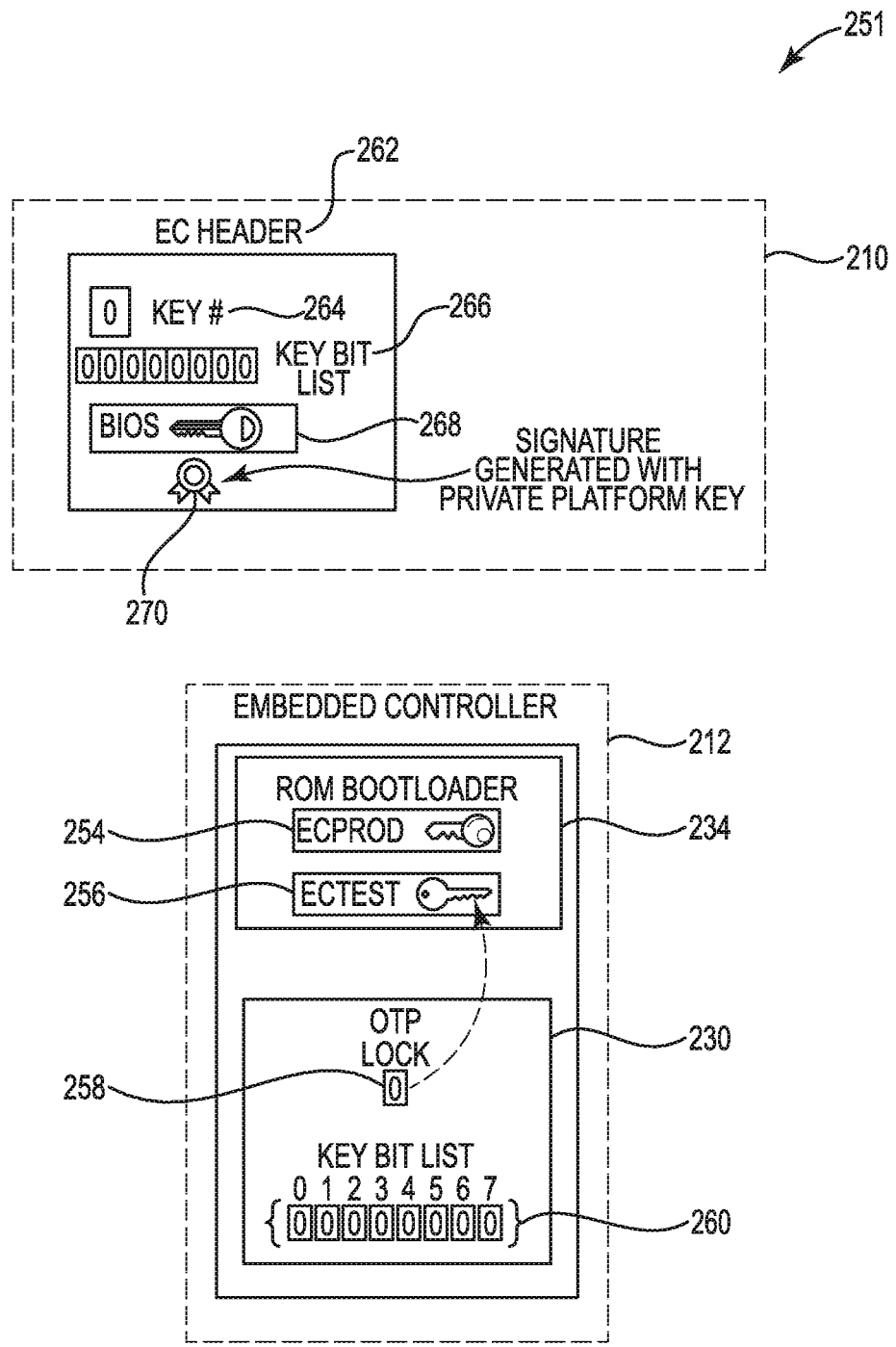
FIG. 2 illustrates a diagram of an example of a system for a platform key hierarchy consistent with the present disclosure.

FIG. 2 illustrates a diagram of an example of a system 251 for a platform key hierarchy consistent with the present disclosure. The system 251 can represent a memory resource 210. In some examples, the memory resource 210 can be an external flash memory resource that can be utilized in an attempt to validate a public platform key 268. In some examples, the memory resource 210 can include an embedded controller header 262, a key number 264, a key bit list 266, a public platform key 268, and/or a signature 270 generated by a private platform key that corresponds to the public platform key 254.

In some examples, the embedded controller header 262 stored in a private non-volatile memory resource (e.g., private non-volatile memory resource 110 as referenced in FIG. 1, header 119 as referenced in FIG. 1, etc.) that is coupled to the embedded controller 212 can be authenticated by the embedded controller 212. In some examples, a hash can be generated and compared to a value generated by decrypting the signature 270 with the public platform key 254 or 256. When the hash and the value match the embedded controller header 262 can be authenticated.

In some examples, the memory resource 210 can include a key bit list 266. In some examples, the key bit list 266 can be a key bit mask that designates active keys and inactive keys that are stored within the embedded controller 212. The key bit list 266 shows a total of eight bits that can be utilized for activating or deactivating eight different platform keys, however a fewer number of bits or a greater number of bits can be utilized. The key bit list 266 can utilize a "0" when a corresponding key number is to be active and a "1" when a corresponding key number is to be inactive or revoked from utilization. In some examples, the key bit list 266 can be updated by the memory resource 210 when an acceptable key number 264, embedded controller header 262, and signature 270 generated by the private key associated with the public key 268 are authenticated by the embedded controller 212 using the embedded key bit list 260 and the embedded key 254 or 256. In some examples, the key bit list 266 can comprise eight bits where each bit corresponds to a fuse or antifuse that can be set individually in the key bit list 26 stored within the OTP 230. Updating the key bit list 266 will be described further with reference to FIG. 3.

The public key 268 within the memory resource 210 can be utilized along with a public platform key 254 for a cryptographic-based verification technique. For example, the public keys 268 and 254 can be utilized in a Rives, Shamar, and Adleman (RSA) verification technique. In some examples, the memory resource 210 can include a signature 270. In some examples, the signature 270 can be a signature that is generated with a private platform key associated with the public platform key 254 or 256. For example, the signature 270 can be generated with the private key that is stored in a secure database.

In some examples, the embedded controller can include a ROM bootloader 234. As described herein, the bootloader 234 can be stored in ROM and utilized to store instructions for a startup of a computing system and/or for resuming the computing system from a low power state (e.g., sleep state, etc.). In some examples, the ROM bootloader 234 can include a public platform key 254. In some examples, the public platform key 256 can be an embedded controller test public platform key (e.g., a public platform key utilized during testing of the system, etc.).

In some examples, the embedded controller 212 can include an OTP memory resource 230. The OTP memory resource 230 can include a lock value 258 and/or a key bit list 260. The lock value 258 can be utilized to revoke the public platform key 256 when the system is sent for production uses. For example, there can be instructions associated with the public platform key 256 that a manufacturer may not want users who purchase the computing system to utilize. In this example, the public platform key 256 can be permanently locked from being used when the lock value is "1".

In some examples, the key bit list 260 can include a blocked/revoked key bit mask that can be utilized to determine which of a number of private platform keys associated with the public platform keys 254 are to be active or are to be inactive. For example, a key number 264 can be compared to the key bit list 260 to determine whether the key number 264 has been blocked and inactive or whether the key number 264 is active. Examples of utilizing the key bit list 260 and updating the key bit list 260 are further described with reference to FIG. 3.

Figure 3:
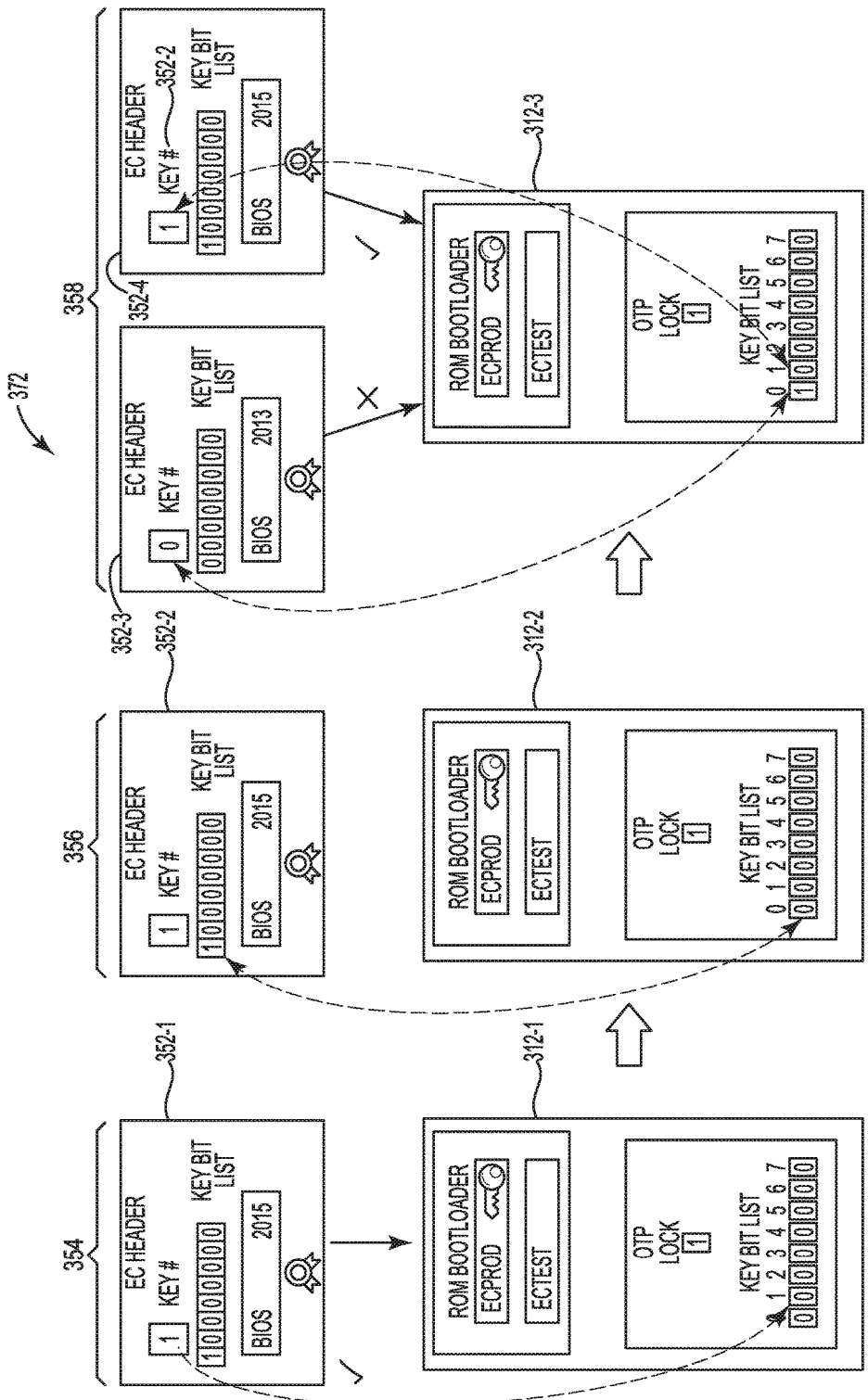
FIG. 3 illustrates a diagram of an example of a method for a platform key hierarchy consistent with the present disclosure.

FIG. 3 illustrates a diagram of an example of a method 372 for a platform key hierarchy consistent with the present disclosure. The method 372 can be utilized to authenticate a source and/or integrity of a public key contained within a data element (e.g., embedded controller header), determine the revocation status of that key, use the public key to verify an integrity and source of a system instructions, and/or update a key bit list of an OTP memory resource.

At 354, the method 372 can include verifying the key number of a verification request 352-1 that includes a signature generated by a private key. In some examples, the verification request 352-1 can be an external platform key authorization certificate. As described herein, the verification request 352-1 can be stored on a memory resource that is coupled to an embedded controller 312-1. As described herein, the verification request 352-1 can include a private embedded controller header, a key number, a key bit list, a public platform key, and/or a signature generated by the private platform key. At 354, the method 372 can include comparing the key number from the verification request 352-1 to the key bit list stored in the OTP memory resource of the embedded controller 312-1.

The key bit list stored in the OTP memory resource of the embedded controller 312-1 can include eight bits that correspond to a particular key number. In some examples, each bit can indicate whether the corresponding private key is an active key or if the corresponding private key is not active or is a revoked key. In some examples, the key number "1" can correspond to bit "1" on the key bit list. In some examples, the key number "1" can be acceptable or verified when the key bit list has a value of "0" corresponding to the key number "1". Thus, the private key number of the verification request 352-1 is verified since the corresponding bit value of the key bit list has a value of "0". When the key number of the system access request 352-1 is verified, the method 372 can move to 356.

At 356, the method 372 can include verifying and/or updating the key bit list of the OTP within the embedded controller 312-2. Verifying the key bit list of the OTP within the embedded controller 312-2 can include comparing the key bit list of the verification request 352-2 to the key bit list of the OTP within the embedded controller 312-2. When the key bit list of the verification request 352-2 matches the key bit list of the OTP within the embedded controller 312-2 there may be no action taken since the key bit list of the OTP within the embedded controller 312-2 is updated. However, when the key bit list of the verification request 352-2 is different than the key bit list of the OTP within the embedded controller 312-2, the key bit list of the OTP within the embedded controller 312-2 can be updated to match the key bit list of the verification request 352-2.

In one example, the key bit list of the verification request 352-2 can have a value of "1" in bit block "0" and the key bit list of the OTP within the embedded controller 312-2 can have a value of "0" in bit block "0". In this example, the key bit list of the OTP within the embedded controller 312-2 can be updated so the bit block "0" has a value of "1". When the bit block "0" has a value of "1" it can indicate that a key associated with the key number or bit block of "0" has been revoked. When the key bit list of the OTP within the embedded controller 312-2 is updated, the method 372 can move to 358.

At 358 a number of verification requests 352-3, 352-4 can be verified. In this example, the signature generated by a private key for each verification request 352-3 can be verified by the embedded controller, then the key number can be compared to the key bit list in the embedded controller to determine if it has been revoked. In this example, the key number for the verification request 352-3 is "0". When the key number of "0" is compared to the key bit list of the embedded controller 312-3, it can be determined that a key corresponding to the key number of "0" has been revoked since the key bit list has a value of "1"

assigned to the key bit "0". Thus, the public key embedded within the verification request for integrity checking of system instruction's is denied by the embedded controller since the system instructions associated with the private key associated with the key bit "0" is no longer an authorized provider.

In another example, the signature generated by a private key for each verification request 352-4 can be verified by the embedded controller, then the key number can be compared to the key bit list in the embedded controller to determine if it has been revoked. In this example, the key number of "1" is compared to the key bit list of the embedded controller 312-3, When the key number of "1" is compared to the key bit list of the embedded controller 312-3, it can be determined that a private key corresponding to the key number of "1" is active and an acceptable private key/key number combination since the key bit list has a value of "0" assigned to the key bit "1". Thus, the verification request 352-4 can be accepted or verified and the key with in the verification request can then be used by the embedded controller to further validate the system instructions.

In some examples, the method 372 can be executed on a computing system (e.g., system 100 as referenced in FIG. 1, etc.). The method 372 can enable third party BIOS to run on the embedded controller as a manufacturer BIOS without compromising a separate embedded controller hardware based chain of trust for a second BIOS provider. For example, a manufacturer can assign a private key and corresponding key number to a third party and the manufacturer can revoke the private key and corresponding key number by updating the key bit list stored in the OTP memory resource. This example, can prevent instructions from the third party from running once the private key and corresponding key number is revoked via the key bit list.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for a platform key hierarchy, comprising:
an embedded controller to:
store a first public platform key with a key bit list corresponding to a number of valid private platform keys;
verify a second public platform key by comparing a key number corresponding to a private platform key to the key bit list, wherein the key bit list includes a revoked key bit mask to determine which of a number of private platform keys associated with the public platform keys are active and inactive; and
revoke the second public platform key based on a determination that the corresponding private platform key associated with the public platform key is inactive.

2. The system of claim 1, wherein the first public platform key is permanently embedded within the embedded controller.

3. The system of claim 2, comprising the embedded controller to verify the second public platform key by verifying a signature produced by the private platform key.

4. The system of claim 1, wherein the key bit list is stored in a one-time programmable (OTP) memory resource within the embedded controller.

5. The system of claim 1, wherein to verify the second public platform key includes verifying a digital signature generated by the private key prior to executing the instructions.

6. The system of claim 1, comprising the embedded controller to revoke a particular platform key.

7. The system of claim 6, wherein the embedded controller is to update a key bit list stored on the embedded controller to revoke the particular platform key.

8. A system for a platform key hierarchy, comprising:
an embedded controller coupled to a non-volatile memory resource, wherein the embedded controller is to:
verify a public platform key and corresponding key number stored in an external memory resource by:
verifying a signature generated by a private platform key utilizing the public platform key;
comparing the corresponding key number to a key bit list, wherein the key bit list includes a revoked key bit mask to determine which of a number of private platform keys associated with the public platform keys are active and inactive; and
revoking the public platform key based on a determination that the corresponding private platform key associated with the public platform key is inactive.

9. The system of claim 8, wherein a number of instructions of the non-volatile memory resource are verified utilizing the public platform key when the private platform key is verified.

10. The system of claim 8, wherein the key bit list is stored in a memory resource comprising a number of bits where each setting of a bit is locked by a fuse.

11. The system of claim 10, wherein a platform key is revoked when a corresponding key number of the platform key is locked in the key bit list.

12. A method for a platform key hierarchy, comprising:
receiving, at an embedded controller, a request for platform key verification, wherein the request comprises a header, a key number associated with the platform key, and a platform key signature;
verifying, at the embedded controller, the header, the key number and the platform key signature;
comparing, at the embedded controller, the key number to a key bit list, wherein the key bit list includes a revoked key bit mask to determine which of a number of private platform keys associated with the platform keys are active and inactive; and
revoking, at the embedded controller, the key number based on a determination that a corresponding private platform key associated with the platform key is inactive.

13. The method of claim 12, wherein verifying the header includes utilizing the platform key embedded within the embedded controller to verify the header.

14. The method of claim 12, comprising updating, at the embedded controller, a blocked key slot by comparing a key bit list with the platform key signature to a key bit list stored in the embedded controller.

15. The method of claim 14, wherein updating a blocked key slot includes locking a fuse of the key bit list stored in the embedded controller to match the key bit list with the private platform key signature.

* * * * *